ANDREAS ANTONIOU,
INVENTOR

BY Hall & Houghton
ATTORNEY

ANDREAS ANTONIOU
INVENTOR
BY Hall & Houghton
ATTORNEY

Feb. 9, 1971 A. ANTONIOU 3,562,678
ELECTRICAL IMPEDANCE NETWORKS
Filed April 30, 1968 3 Sheets-Sheet 3

ANDREAS ANTONIOU
INVENTOR
BY Hall & Houghton
ATTORNEY

United States Patent Office 3,562,678

Patented Feb. 9, 1971

3,562,678

ELECTRICAL IMPEDANCE NETWORKS

Andreas Antoniou, Hounslow, England, assignor to Her Majesty's Postmaster General, London, England Filed Apr. 30, 1968, Ser. No. 725,416
Claims priority, application Great Britain, May 4, 1967, 20,882/67
Int. Cl. H03h *7/44*
U.S. Cl. 333—80 13 Claims

ABSTRACT OF THE DISCLOSURE

Two port electrical impedance networks in the form of a bridge circuit having opposite pairs of arms, a first pair of which exhibit electrical resistance and the other pair forming, respectively, the input and output ports of a high gain amplifier. The amplifier can be a voltage or current source and may be voltage controlled or current controlled. Negative impedance inverters and gyrators are described which use operational amplifiers, i.e. voltage controlled voltage sources having, ideally, infinite input impedance and zero output impedance. In the negative impedance inverters, the first pair of arms of the bridge both exhibit positive electrical resistance and in the gyrators one arm of the first pair of arms exhibits negative resistance (e.g. by use of a negative impedance converter) and the other exhibits positive resistance. The use of the gyrators to convert an inductance into a capacitance and to convert a capacitance into an inductance is described and direct-coupled gyrators having varying quality and bandwidth can be produced using commercially available integrated circuits.

FIELD OF THE INVENTION

The invention relates to two-port electrical impedance networks of the kind which present at one port an impedance which is related to but different in kind from that which is connected to the other port.

SUMMARY OF THE INVENTION

According to the invention an electrical network comprises a four-arm bridge circuit the first pair of opposite arms of which exhibit resistance, and the second pair of opposite arms being respectively the input and output ports of a high gain amplifier.

In one embodiment, the first pair of arms both have positive resistance, whereby the diagonals of the bridge constitute the two ports of a negative impedance inverter.

In another embodiment one arm of the first pair has positive resistance and the other has negative resistance, whereby the diagonals of the bridge constitute the two ports of a gyrator.

BRIEF DESCRIPTION OF THE DRAWINGS

By way of example, the invention will be described in greater detail with reference to the accompanying drawings in which.

DESCRIPTION OF PREFERRED EMBODIMENTS

In each of the four parts of FIG. 1 the terminals 1, 1′ form one port of the device and the terminals 2, 2′ form the other port. In each case the arm 1, 2′ comprises the input port of a high (ideally infinite) gain controlled source and the arm 1′, 2 comprises the output port of that source. In FIG. 1(*a*) the source is a voltage-controlled voltage source, that is to say a high gain amplifier with high input impedance and low output impedance. (This type of amplifier is commonly referred to as an operational amplifier and ideally has infinite gain, infinite input impedance and zero output impedance.) In FIG. 1(*a*) the input terminals of the controlled source are indicated by the reference IN and the output of the source is represented by the element GV, the gain of the source being G so that when an input voltage of V is applied across the terminals IN an output voltage of GV is set up at the output of the source. In FIG. 1(*b*) the source is a voltage controlled current source, that is to say a high gain amplifier with a high input impedance and a high output impedance, having an input voltage V and producing an output current YV. In FIG. 1(*c*) the source is a current controlled current source, that is to say a high gain amplifier with a low input impedance and a low output impedance, having an input current of *i* and producing an output voltage of Z*i*. In FIG. 1(*d*) the source is a current controlled current souce, that is to say a high gain amplifier with a low input impedance and a high output impedance having an input current of *i* and producing and output current H*i*. In each of FIGS. 1(*a*), (*b*), (*c*) and (*d*), the terminals 1 and 2 are connected by a resistor $R_1$ and the terminals 1′ and 2′ by a resistor $R_2$ the input terminals of the controlled sources being represented by two small circles and the output terminals of the sources being represented by connections on opposite sides of a circular box.

Figure 1A:
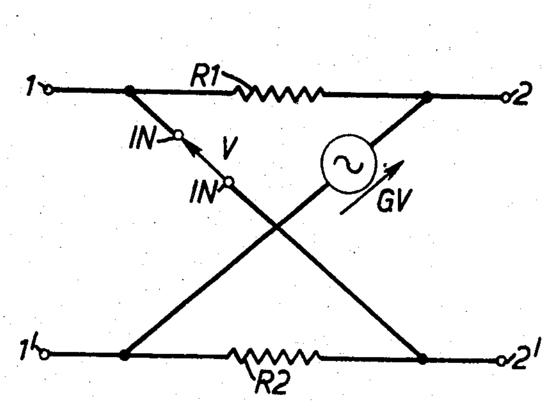
FIG. 1 shows schematically at *a*, *b*, *c* and *d* four forms of negative impedance inverter embodying the invention.
Figure 1B:
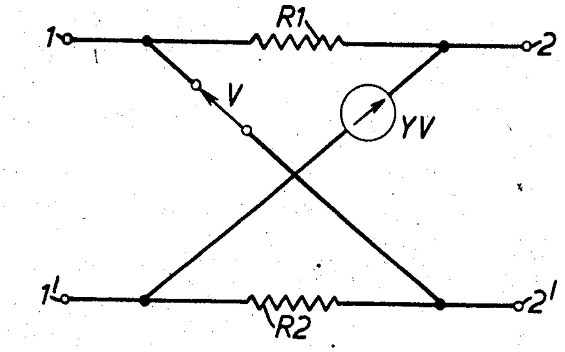
Figure 1C:
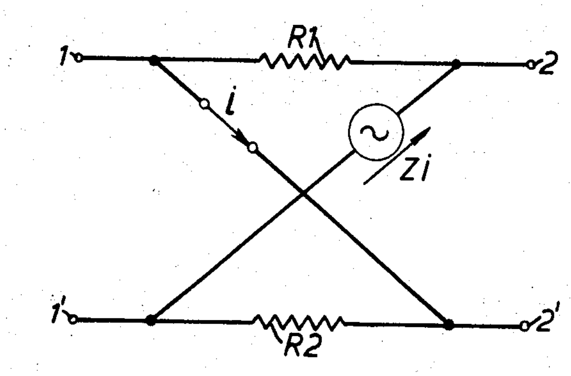
Figure 1D:
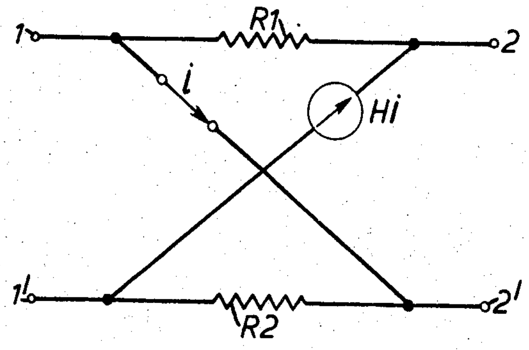
Figure 2:
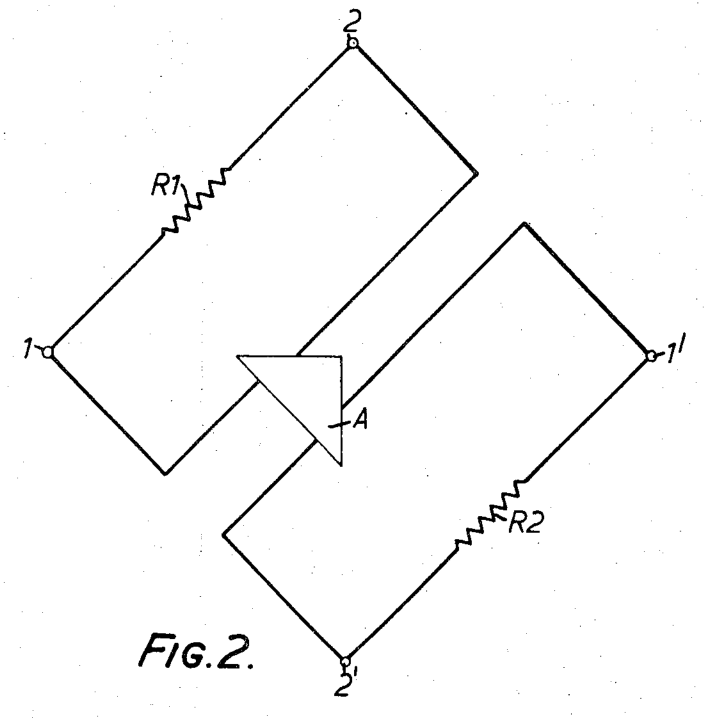
FIG. 2 depicts one of the networks shown in FIG. 1 drawn as a bridge circuit.

In FIG. 2 the circuit of any of FIGS. 1(*a*) and 1(*b*) is drawn as a bridge, the input and output characteristics of the amplifier A being chosen to comply with one of the four sets of conditions related in the preceding paragraph.

A particular practical form of the invention using the configuration of FIG. 1(*a*) will now be described with reference to FIG. 3. A voltage appearing at the terminals IN (c.f. FIG. 1(*a*) of a differential amplifier DA causes a much larger corresponding voltage to appear in the bridge arm between terminals 1′ and 2. The amplifier DA has a high input impedance, a low output impedance, and a high voltage gain. The symbols "+" and "−" indicate the non-inverting and the inverting input terminal respectively of the amplifier DA. If an impedance Z is connected between terminals 2 and 2′ an impedance $$-\frac{R_1R_2}{Z}$$

is seen at terminals 1 and 1′. Comparing FIG. 3 with FIG. 2, it is seen that one port (1, 1′) of the negative impedance inverter shown in FIG. 3 is constituted by one diagonal of the bridge shown in FIG. 2, and the other 2, 2′ is constituted by the other bridge diagonal.

The chain matrix for an ideal negative impedance inverter is:

$$[a]_{\text{N.I.I.}}=\begin{bmatrix} 0 & \mp R_2 \\ \pm\frac{1}{R_1} & 0 \end{bmatrix}— \quad (1)$$

Figure 3:
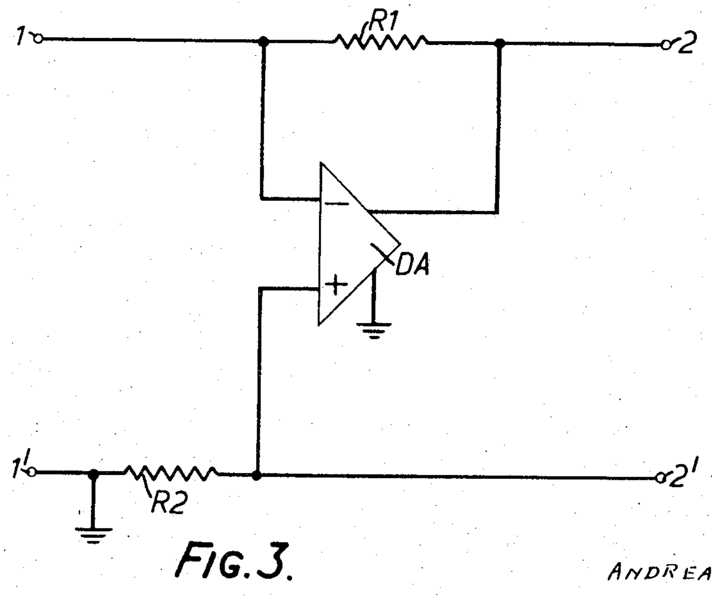
FIG. 3 shows in block form a practical circuit of a negative impedance inverter embodying the invention.

The chain matrix for the circuit shown in FIG. 1(*a*) and FIG. 3 is:

$$[a]=\begin{bmatrix}\frac{1}{G} & \frac{R_2(G+1)}{G}\\ \frac{-(G-1)}{GR_1} & \frac{R_2}{GR_1}\end{bmatrix} \quad (2)$$

where G is the voltage gain of the amplifier DA.

The gain G may be positive or negative, and if $|G|\gg|$ the matrix is seen to approximate (to a degree which increases with $|G|$) to that of an ideal impedance inverter. Generally the magnitude of the gain G and the values of the resistors $R_1$ and $R_2$ would be chosen so as to achieve an acceptable approximation to the ideal and in certain circumstances a gain of about 50 can be acceptable although usually a higher value, e.g. greater than about 1,000 would be desired. In one practical embodiment the resistors $R_1$ and $R_2$ were each 1 k.Ω and the voltage gain G of the amplifier was 45,000. A Fairchild type μa. 709C operational amplifier is a suitable amplifier for the purpose.

If in the circuit described with reference to FIG. 3 either $R_1$ or $R_2$ is made negative, then the chain matrix becomes:

$$[a]=\begin{bmatrix}0 & \pm R_2\\ \pm\frac{1}{R_1} & 0\end{bmatrix} \quad (3)$$

which is the matrix of a gyrator.

Figure 4:
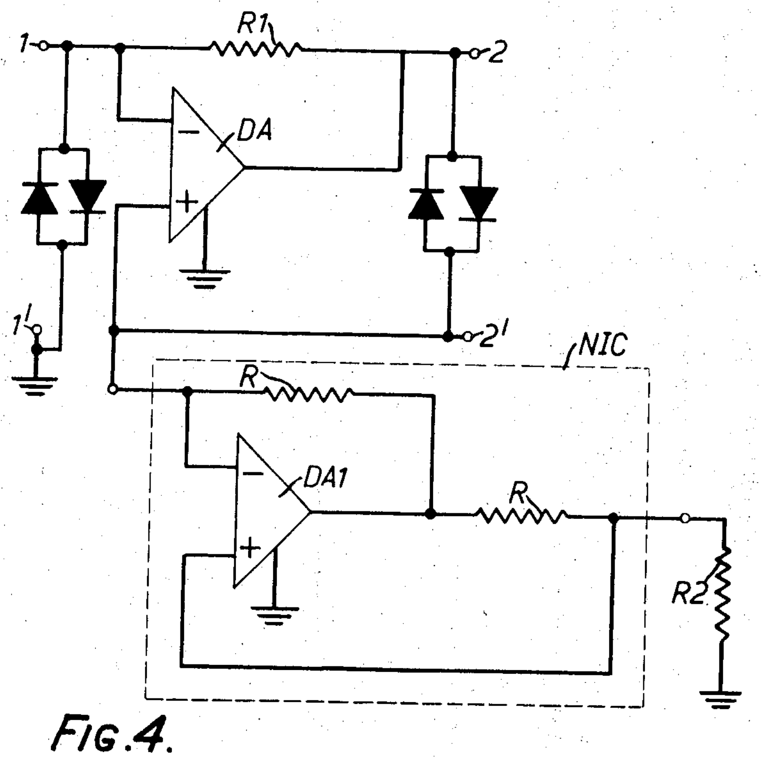
FIG. 4 shows in block form a practical circuit of a gyrator embodying the invention.

FIG. 4 shows a circuit in which the resistor $R_2$ of FIG. 3 has been replaced by one port of a current-inversion negative impedance converter NIC of a known kind. The resistor $R_2$ is connected to the other port of the converter, so that a negative resistance $-R_2$ appears at the first port when the two resistors R are equal. It will be seen that by substituting $-R_2$ for $R_2$, Equation 1 is converted into Equation 3 and the device exhibits the properties of a gyrator between the ports 1, 1′ and 2, 2′. The inverting and non-inverting inputs of the amplifiers DA and DA1 may be arranged as shown in the drawing, or they may both be reversed. In one example the resistors $R_1$, $R_2$ and R may each be 1 k.Ω and the amplifiers DA and DA1 may each be Fairchild type μa. 709C operational amplifiers with a voltage gain of 45,000.

Figure 5:
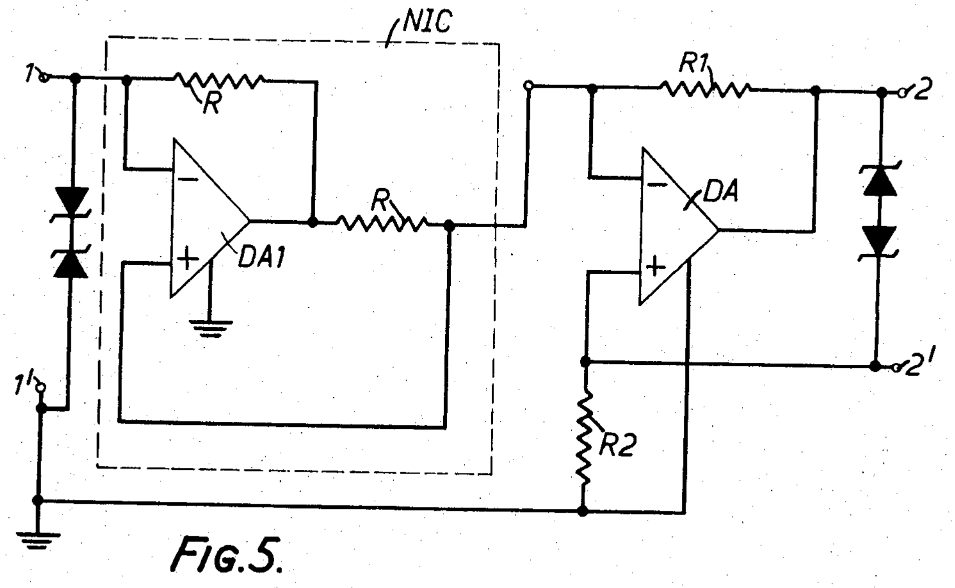
FIG. 5 shows in block form another practical circuit of a gyrator embodying the invention.

FIG. 5 shows another gyrator in which a current-inversion negative impedance converter NIC, of known type including an operational amplifier DA1, is connected in cascade with a negative impedance inverter embodying the invention. An impedance Z connected to port 2, 2′ causes an impedance $$-\frac{R_1R_2}{Z}$$

to be presented to the output of the converter NIC which in turn presents an impedance $$\frac{R_1R_2}{Z}$$

at its input port 1, 1′ when the two resistors R are equal. As in the arrangement shown in FIG. 4, the inverting and non-inverting inputs of the amplifiers DA and DA1 may be arranged as shown or they may both be reversed. The amplifiers DA and DA1 are operational amplifiers.

The circuits as shown in FIGS. 4 and 5 are suitable for converting an inductance connected across the port 2, 2′ to a capacitance as seen at the port 1, 1′, or for converting a large resistance across the port 2, 2′ to a small resistance as seen at the port 1, 1′. By reversing the connections of the inverting and non-inverting inputs of the amplifiers shown in FIGS. 4 and 5, the circuits become suitable for converting a capacitance (or a small resistance) connected across the port 2, 2′ into an inductance (or a large resistance) seen at the port 1, 1′.

Practical results obtained using the circuit shown in FIG. 5, with the port 2, 2′ terminated by a capacitance C, are shown in the Table below. The amplifiers DA and DA1 were both Fairchild type μa. 709C operational amplifiers and the resistors R, $R_1$, and $R_2$ each were of 1 k.Ω value. The table shows values of the modulus of the impedance $Zi$ measured at the port 1, 1′ at several frequencies with different capacitances terminating the port 2, 2′.

TABLE

| Frequency, kHz. | \|Zi\| kohms | | |
|---|---|---|---|
| | C=0.01/μf. | C=0.1/μf. | C=1.0/μf. |
| 0.3 | 0.0188 | 0.1850 | 1.888 |
| 1.0 | 0.06276 | 0.6269 | 6.286 |
| 3.0 | 0.1872 | 1.8760 | 18.84 |
| 10.0 | 0.6224 | 6.269 | 62.19 |

The theoretical value of $|Zi|$ is $2\times10^6\pi fC$.

The circuits shown in FIGS. 4 and 5 yield ideal gyrators only when the amplifiers have infinite gains, infinite bandwidths and zero phase shift. In practice, these conditions cannot be achieved and, as a result, even with an ideal capacitor terminating the port 2, 2′, a non-ideal inductance is seen at the port 1, 1′, and the inductance has an associated series resistance. In some cases, this series resistance is negative so that the inductance has a negative Q-factor and thus can be utilised in construction of an oscillator by connection of a suitable capacitance across the port 1, 1′. Alternatively, if an oscillator is not required, the negative resistance can be neutralised by a positive resistance connected in series or in shunt with the port 1, 1′.

The stability of the gyrators shown in FIGS. 4 and 5 is dependent on the gains of the amplifiers. It has been found that when the amplifier gains are less than about 10, the circuits tend to be unstable. When power is applied to the circuit, the gains begin to rise from zero and at these low values of gain the circuit can oscillate, with the result that the amplifiers saturate; consequently the gains of the amplifiers cease to increase and the circuit remains in an unstable mode of operation. This difficulty can be overcome by connecting pairs of back-to-back diodes across the ports 1, 1′ and 2, 2′ as shown in FIG. 4 or pairs of series opposed Zener diodes across those ports, as shown in FIG. 5. The diodes limit the amplitude of oscillation and allow the amplifier gains to increase so that the unstable mode of operation is not established.

The chain matrices for the circuits shown in FIGS. 1(*b*), 1(*c*) and 1(*d*) are as follows:

FIG. 1(*b*) $$\begin{vmatrix}\frac{1}{YR1+1} & \frac{R1+R2(1+R1Y)}{YR1+1}\\ \frac{-Y}{YR1+1} & \frac{1}{YR1+1}\end{vmatrix}$$

FIG. 1(*c*) $$\begin{vmatrix}\frac{R2}{Z-R2} & \frac{ZR2}{Z-R2}\\ -\frac{Z-(R1+R2)}{(Z-R2)R1} & \frac{R2}{Z-R2}\end{vmatrix}$$

FIG. 1(*d*) $$\begin{vmatrix}\frac{R2}{R1H} & \frac{(H+1)R2}{H}\\ -\frac{H-1}{HR1} & \frac{1}{H}\end{vmatrix}$$

I claim:

1. An electrical network having network input and output ports each with two terminals, and comprising a high gain amplifier having amplifier input and amplifier output ports each with two terminals, a first circuit exhibiting electrical resistance only connected from one terminal of the amplifier output port to one terminal of the amplifier input port and a second circuit exhibiting electrical resistance only connected from the other terminal of the amplifier output port to the other terminal of the amplifier input port the terminals of the network input port being respectively directly connected to the one terminal of amplifier input port and the other terminal of the amplifier output port and the terminals of the network output port being respectively directly connected to the other terminal of the amplifier input port and the one terminal of the amplifier output port.

2. An electrical network according to claim 1, wherein the amplifier gain exceeds about 10.

3. An electrical network according to claim 1, wherein the amplifier gain exceeds about 50.

4. An electrical network according to claim 1, wherein the amplifier comprises a high gain voltage controlled voltage source having a high input impedance and a low output impedance.

5. An electrical network according to claim 4, wherein the amplifier is a differential, operational amplifier.

6. A negative impedance inverter network having network input and output ports each with two terminals, and comprising a high gain amplifier having amplifier input and amplifier output ports each with two terminals, a first circuit exhibiting positive electrical resistance only connected from one terminal of the amplifier output port to one terminal of the amplifier input port and a second circuit exhibiting positive electrical resistance only connected from the other terminal of the amplifier output port to the other terminal of the amplifier input port, the terminals of the network input port being respectively directly connected to the one terminal of the amplifier input port and the other terminal of the amplifier output port and the terminals of the network output port being respectively directly connected to the other terminal of the amplifier input port and the one terminal of the amplifier output port.

7. A network according to claim 6 wherein the said amplifier is an operational amplifier.

8. A gyrator network comprising a negative impedance inverter network according to claim 6, and a negative impedance converter connected in cascade with the input port of the said inverter network.

9. A gyrator network according to claim 8, wherein the said amplifier of the negative impedance network is an operational amplifier and wherein the negative impedance converter includes an operational amplifier.

10. A gyrator network having network input and output ports each with two terminals, and comprising a high gain amplifier having amplifier input and amplifier output ports each with two terminals, a first circuit exhibiting positive electrical resistance only connected from one terminal of the amplifier output port to one terminal of the amplifier input port and a second circuit exhibiting negative electrical resistance only connected from the other terminal of the amplifier output port to the other terminal of the amplifier input port, the terminals of the network input port being respectively directly connected to the one terminal of amplifier input port and the other termial of the amplifier output port and the terminals of the network output port being respectively directly connected to the other terminal of the amplifier input port and the one terminal of the amplifier output port.

11. A gyrator network according to claim 10, wherein the said second circuit exhibiting negative resistance includes a negative impedance converter terminated by a positive resistance.

12. A gyrator according to claim 11, wherein the said high gain amplifier is an operational amplifier and the said negative impedance converter includes an operational amplifier.

13. A gyrator network according to claim 11, including respective pairs of oscillation damping diodes shunting the said input and output ports of the gyrator network.

References Cited

UNITED STATES PATENTS

| | | | |
|---|---|---|---|
| 2,775,658 | 12/1956 | Mason et al. | 333—80 |
| 2,817,822 | 12/1957 | Meyers | 333—80 |
| 3,304,507 | 2/1967 | Weekes et al. | 330—69X |

OTHER REFERENCES

Mitra: Alternate Realizations of Four-Terminal and Three-Terminal Negative Impedance Inverters, Proc. IEEE, March 1968, pp. 333–80.

Van Scoyoc et al.: High-Q Variable Reactance, Electronics, January 1949, p. 118 relied on.

Handbook of Operational Amplifier Applications, Burr-Brown Research Corp., 1963, pp. ii and 22 relied on.

HERMAN KARL SAALBACH, Primary Examiner

P. L. GENSLER, Assistant Examiner

U.S. Cl. X.R.

307—229; 330—69